(12) United States Patent
Chen et al.

(10) Patent No.: US 8,488,545 B2
(45) Date of Patent: Jul. 16, 2013

(54) REGION-BASED CLUSTERING MECHANISM FOR CHANNEL ACCESS IN VEHICULAR AD HOC NETWORKS

(75) Inventors: Chung-Min Chen, Taipei (TW);
Yen-Cheng Lai, Xindian (TW);
Wanjiun Liao, Yonghe (TW); Phone Lin, Tainan (TW)

(73) Assignee: Telcodia Applied Research Center Taiwan Co., Taipei (TW)

( * ) Notice: Subject to any disclaimer, the term of this patent is extended or adjusted under 35 U.S.C. 154(b) by 268 days.

(21) Appl. No.: 13/110,118

(22) Filed: May 18, 2011

(65) Prior Publication Data

US 2012/0120883 A1 May 17, 2012

Related U.S. Application Data

(60) Provisional application No. 61/345,713, filed on May 18, 2010.

(51) Int. Cl.
*H04W 72/04* (2009.01)
(52) U.S. Cl.
USPC .......................................................... 370/329
(58) Field of Classification Search
USPC .......................................................... 370/329
See application file for complete search history.

(56) References Cited

U.S. PATENT DOCUMENTS

| 2009/0010268 A1* | 1/2009 | Giacomazzi et al. ......... 370/400 |
| 2010/0220707 A1* | 9/2010 | Teo et al. ....................... 370/343 |
| 2011/0128849 A1* | 6/2011 | Guo .............................. 370/235 |

OTHER PUBLICATIONS

S. V. Bana, P. Varaiya, "Space Division Multiple Access (SDMA) for Robust Ad Hoc Vehicle Communication Networks,"IEEE Fourth International Conference on Intelligent Transportation Systems, pp. 1-6, 2007.
J. J. Blum, A. Eskandarian, "A Reliable Link-Layer Protocol for Robust and Scalable Intervehicle Communications," IEEE Transactions on Intelligent Transportation Systems, vol. 8, No. 1, pp. 4-13, Mar. 2007.
F. Borgonovo, A. Capone, M. Cesana, L. Fratta, "RR-Aloha, A Reliable R-Aloha Broadcast Channel for Ad-Hoc Inter-Vehicle Communication Networks," Proceedings of Med-Hoc-Net, pp. 1-5, 2002.

* cited by examiner

*Primary Examiner* — Sulaiman Nooristany
(74) *Attorney, Agent, or Firm* — Philip J. Feig

(57) ABSTRACT

In a Vehicular Ad Hoc Network (VANET) a hybrid method combines SDMA (Space Division Multiple Access) and dynamic TDMA (Time Division Multiple Access) that divides the roadway into regions (whose size is larger than the SDMA unit) where each region is allocated a pool of radio channels based on SDMA and may contain a limited number of vehicles. Vehicles within the same region compete for and access the channels using dynamic TDMA. A channel allocation scheme that maps the pool of channels to the regions such that when a vehicle acquires multiple channels (time slots) in a region, the intervals among the channels are as uniform as possible, thus minimizing the waiting time of the messages to be broadcast by the vehicle, which is critical for safety related applications. This solution is referred to as R-SDMA (Region based SDMA).

13 Claims, 1 Drawing Sheet

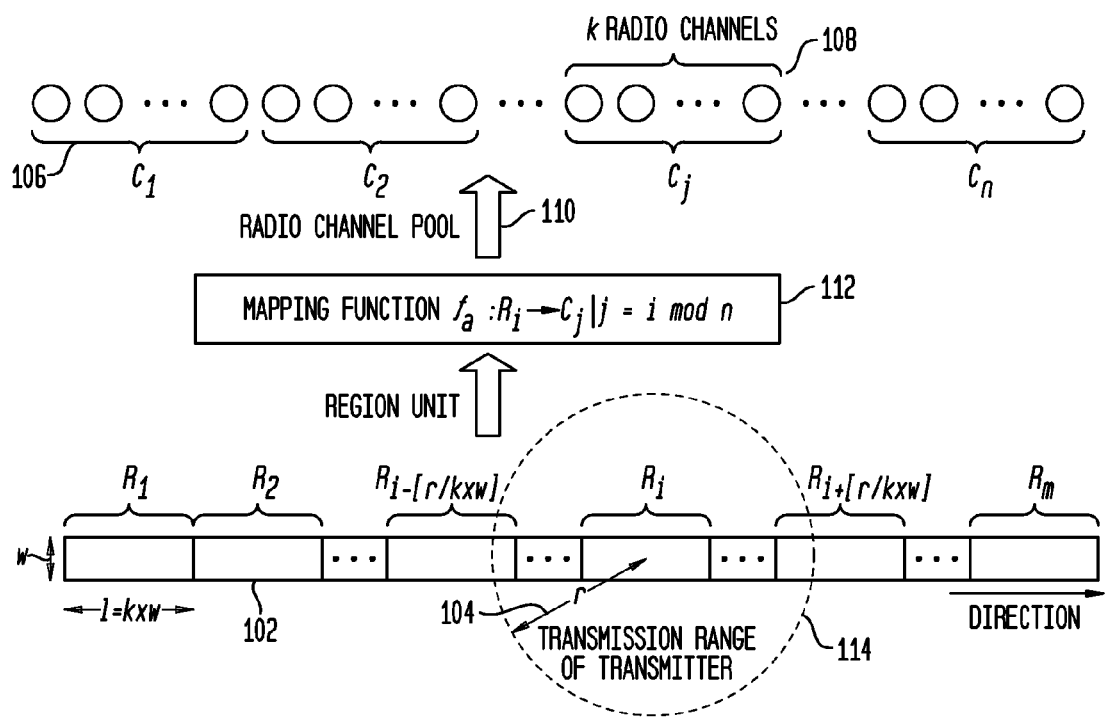

REGION-BASED CLUSTERING MECHANISM FOR CHANNEL ACCESS IN VEHICULAR AD HOC NETWORKS

CROSS-REFERENCE TO RELATED APPLICATIONS

This application claims the benefit of U.S. Provisional Application No. 61/345,713, filed on May 18, 2010 which is incorporated by reference herein in its entirety.

FIELD OF THE INVENTION

The present invention relates generally to a channel allocation and access scheme for Vehicular Ad Hoc Networks (VANET) that efficiently assigns radio channels to mobile nodes (vehicles) to ensure timely delivery of broadcast data messages in the VANET network.

BACKGROUND OF TILE INVENTION

A Vehicular Ad Hoc Network (VANET) consists of a group of vehicles that communicate with each other through on-board wireless communication modules. One of the most important applications for VANET is the broadcast of real-time safety advisories and/or warning messages from vehicles that sense the situation of the vehicles nearby or behind. This class of applications, called Safety-Critical Application (SCA), requires timely and reliable message dissemination.

VANETs, like other wireless data networks such as WiFi (IEEE 802.11) or cellular networks (e.g. UMTS), must employ a MAC (Medium Access Control) protocol to dynamically allocate the radio channels available in the spectrum to the nodes in the network for data transmission, where the nodes may join or leave the network at any time. The section in the MAC protocol that implements this function is called the channel access scheme. In addition, the MAC protocol is also responsible for assembling incoming data frames received from the PHY (Physical) layer into packets and forwarding the packets to the upper layer, as well as for disassembling outgoing packets into bits that can be further processed by the PHY layer and transmitted. The design of the MAC protocol depends on factors including the available spectrum, the speed of the nodes, the bandwidth/delay requirements of the applications, etc.

The design of a channel access scheme for VANET poses new challenges that are not seen in the MAC design for WiFi or cellular networks. In comparison to WiFi, the nodes (i.e. vehicles) in a VANET are moving at a very high speed, much higher than the nodes in a WiFi network (which typically are stationary devices or nomadic user devices). The implication is that the VANET MAC must be able to assign channels to a node at a very short response time, much shorter than is allowed in the WiFi network, in order to ensure timely transmission of the data from the node (e.g., before the vehicle moves out of the range of a VANET cluster).

In comparison to the UMTS cellular data network, the VANET does not have infrastructure support (such as base station and base station controller which are all stationary elements) and thus the medium access control must rely on a distributed scheme among the mobile nodes (vehicles) in the network. There is no single fixed entity in a VANET that will collect ancillary information and perform medium access control.

In summary, the challenges related to the MAC design of VANET for message broadcasting include:

Mobility: the MAC protocol should support vehicles that leave and join the VANET at high speed.

Delay-bounded: channel acquisition and data transmission must be delay-bounded.

Scalability: the VANET should function as the number of vehicles increases.

Bandwidth efficiency: the radio resource should be utilized in an efficient and fair manner.

Fail-safe: no failure of any vehicle in the VANET should cause communication to fail among the remaining vehicles.

Fairness: every vehicle should get a fair chance to access the radio channels.

The present invention provides a novel channel allocation and access scheme for VANET that meets the above challenges.

There are three classes of existing MAC protocols of VANET that resolve contention among vehicles for channel access: contention-based, dynamic TDMA, and SDMA (Space Division Multiple Access).

Contention-based protocols use the Carrier Sense Multiple Access (CSMA) mechanism, in which vehicles transmit data only after sensing that the medium (radio channel) is idle. It is possible that more than one vehicle sense that the medium is idle and try to transmit at the same time. When that happens each transmitting vehicle will sense the data they sent is corrupted (due to a collision with data sent out by other vehicle(s) at the same time), and each vehicle will back off for a random or pre-defined period before making the next attempt. The vehicle will release the radio channel after the data transmission (usually limited to a maximum size data frame) is completed. It will need to compete with other vehicles again if there is more data to transmit, either immediately or at a later time.

There are two well-know content-based protocols for VANET:

IEEE 802.11p: The US has allocated the spectrum 5.855-5.925 GHz for Dedicated Short Range Communication (DSRC) to support ITS (Intelligent Transportation System) applications. The dominant DSRC standard for vehicular networks is IEEE 802.11p. Its medium access mechanism is based on the IEEE 802.11 Distributed Coordination Function (DCF), which basically is a Carrier Sense Multiple Access/Collision Avoidance (CSMA/CA) mechanism.

In dynamic TDMA (Time Division Multiple Access), radio spectrum is slotted into a sequence of time frames (windows), . . . , $F_{i-1}$, $F_i$, $F_{i+1}$, . . . , where each frame $F_i$ contains a fixed number of time slots $S_{i,1}$, $S_{i,2}$, ... $S_{i,n}$. The same time slot in subsequent frames, e.g., $S_{i,k}$, $S_{i+1,k}$, $S_{i+2,k}$, ... form a channel that can be assigned to a vehicle, say V, which then can transmit data in the time slots of the assigned channel. The channel cannot be used by other vehicles until V releases it. Dynamically assigning the channels (time slots) to the vehicles (that join and leave the network) is the main task of any Dynamic TDMA scheme.

The RR-ALOHA (Reliable Reservation-ALOHA) is a distributed dynamic TDMA scheme that ensures that channels allocated to vehicles are unique among one-hop neighbors. A node A is a neighbor of another node B if and only if A is within transmission range of B and vice versa. That is, there is two-way communication capability between the nodes. RR-ALOHA is a modification of the original R-ALOHA (Reservation-ALOHA) scheme. R-ALOHA requires a central repeater through which all the vehicles in the network can obtain the slot allocation information. In VANET, such a central repeater is typically not available or feasible to implement. This deficiency is addressed by the distributed protocol of RR-ALOHA which relies solely on the peer vehicles, instead of on a central repeater, to ensure non-overlapping of the channels.

In this regard, some view Dynamic TDMA as a sub-class of contention-based schemes as the peer vehicles must work out to resolve the allocation of (or, competing for) time slots.

SDMA (Space Division Multiple Access) allocates time slots to vehicles based on their current locations. This approach requires each vehicle to be equipped with a positioning module (e.g. GPS positioning devices) so the vehicle can determine its current location. Without loss of generality, take for example a one-lane road. SDMA would divide the road into units, say 5-meter per unit, and assign a unique channel to each unit. The unit size is small enough to contain at most one vehicle and thus the vehicle can use the channel assigned to the unit without competition and interference from other vehicles. Channel re-use can also be achieved, e.g., by assigning the channels to the road units in a round-robin manner and requiring that the radio transmission range of each vehicle is less than the length of N consecutive units, where N is the total number of channels. This way, a vehicle can safely transmit on the channel assigned to it without worrying about interference caused by another vehicle that is transmitting at the same time on the same channel that is located N-unit way.

Contention-based schemes such as DSRC (e.g. IEEE 802.11p) and Dynamic TDMA (e.g. RR-ALOH) suffer from long delay when the density of vehicles increases. This is because more vehicles in the same region will result in higher likelihood of simultaneous data transmission and thus a significant increase in transmission collisions. When collisions occur, the vehicles will need to back off for a time period and retry, which again may result in another round of transmission collisions.

The non-contention based SDMA scheme, on the other hand, performs well when the vehicle density is extremely high, namely when each 5-meter unit is occupied with a single vehicle. However, the regular road traffic hardly sees one vehicle per 5-meter unit, except when traffic jam develops. At a relative sparse vehicle density, a large portion of the roadway will be unoccupied and the channels allocated to the units in this portion will be unused. This results in wasted radio bandwidth. One possible solution to this problem is to increase the size of the units, e.g. from 5-meter to 50-meters, to increase the likelihood that each unit is occupied by a vehicle. Doing such, however, will adversely create the possibility that more than one vehicle may be contained within a unit—a situation for which the existing SDMA does not provide a built-in mechanism to handle. Other prior solutions dynamically combine unused adjacent units into a "super-unit" and assign the aggregate channels to a vehicle traveling in the super-unit.

Contention-based schemes such as IEEE 802.11p and RR-ALOHA do not scale well at high frequencies of transmission requests. These schemes require a contention period for a vehicle to obtain a channel. When the vehicle density increases, more collisions occur to access the channels, which results in longer delay of message transfer and lower data transfer throughput. The R-SDMA scheme of the present invention mitigates this problem by limiting the number of vehicles that can contend for the channels. In accordance with the present invention, at most k vehicles in a region can contend from a channel pool of k channels assigned to the region. This reduces the probability of collision and reduces message transfer delay.

The SDMA scheme has a severe limitation in practice. The vehicle will spend much of its time performing "handoff" as it moves from unit to unit at high speed. In addition, when the vehicle density is sparse, most of the units will be unoccupied and thus the bandwidth of the channels assigned to those units will be wasted. The R-SDMA scheme of the present invention mitigates the above problems by having a larger size region than a SDMA unit (so handoff is performed less frequently), and by allowing a vehicle to gain multiple channels in a region (so the bandwidth is better utilized when vehicle density is sparse).

SUMMARY OF THE INVENTION

The present invention provides a hybrid method combining SDMA and dynamic TDMA that divides the roadway into regions (whose size is larger than the SDMA unit). Each region is allocated a set of channels based on SDMA and may contain a limited number of vehicles. Vehicles within the same region compete for and access the channels using dynamic TDMA. We refer to the solution as R-SDMA (Region based SDMA).

The invention also includes a channel allocation scheme that maps the pool of channels to the regions such that when a vehicle acquires multiple channels (time slots) in a region, the intervals among the channels are as uniform as possible. This minimizes the waiting time of the messages to be broadcast by the vehicle, which is critical for safety related applications.

The IEEE 802.11p scheme is a purely CSMA (Carrier Sense Multiple Access) scheme that does not allocate radio channels to vehicles based on their locations. The channels are acquired by vehicles through contention. In contrast, the R-SDMA scheme of the present invention has a mechanism that allocates radio channels to vehicles based on their locations.

The RR-ALOHA scheme uses dynamic TDMA where vehicles will contend for time slots using the distributed RR-ALOHA contention resolution scheme. RR-ALOHA does not allocate channels to vehicles based on their locations. In contrast, the R-SDMA scheme of the present invention has a mechanism that allocates radio channels to vehicles based on their locations SDMA divides the roadway into units and assign a channel to each unit. The size of the unit is small enough to be occupied by at most one vehicle. Each vehicle uses the channel assigned to the unit within which it currently resides. No contention resolution scheme is used in SDMA as each vehicle is uniquely assigned a channel depending on its location. The R-SDMA scheme of the present invention allows more than one vehicle in an enlarged unit (what is called "region") and employs a contention resolution scheme for vehicles within the same region to compete for the radio channels assigned to the region.

The following table summarizes the differences between our R-SDMA and other prior art schemes:

|  | R-SDMA | SDMA | RR-ALOHA | DSRC |
| --- | --- | --- | --- | --- |
| Assign channels to vehicles based on their locations | YES | YES | NO | NO |
| Length of a "region" | Configurable as multiples of vehicle length | 1 vehicle length | N/A | N/A |

-continued

|  | R-SDMA | SDMA | RR-ALOHA | DSRC |
|---|---|---|---|---|
| Allows vehicles in a "region" to contend for channels | YES | N/A | N/A | N/A |

The convention wisdom when considering MAC protocol for VANET is to use either contention-based medium access control technologies (e.g. WiFi, mesh networks or DSRC) or Dynamic TDMA (e.g. RR-ALHOHA). It is well know that these two schemes will not scale to high road density of vehicles due to frequent media access collision. The concept of SDMA greatly simplifies the MAC protocol (and avoids the scalability problem) but two potential problems resulting from the length of the "unit", which is defined to be the length of a vehicle, were not foreseen. The first problem is that frequent channel hopping (handover) occurs when a vehicle travels through the "units" at a high speed. The consequence is the processor in the OBU in the vehicle will spend most of the time handling the handover and has inadequate resources left to process real work. This may severely limit the practical use of the scheme. Secondly, it was not foreseen that a slight positioning error (as small as, say 4 meters, the length of a vehicle) may result in a failure of the SDMA operation. The error will let a vehicle mistakenly thinks it is located within another "unit" and may use the channel assigned to that unit. If another vehicle is located within that "unit", the result is the two vehicles will transmit on the same channel and the data will be corrupted. It is not obvious how the scalability problem of contention-based schemes and the above two SDMA problems can be solved altogether in one scheme. With the three types of MAC schemes (contention-based, TDMA and SDMA) there are total of 4 combinations of hybrid schemes. Based on an analytical study the inventors concluded that the TDMA+SDMA hybrid method solves the problems.

Even if one attempts to combine the two schemes, SDMA and Dynamic TDMA, into a new protocol, it is not straightforward as there are details that need to be worked out to ensure the correct operation of the protocol. These include issues such as channel re-use without interference, radio transmission range, consistent view of channel states among vehicles and handover. The explicit constraints in this invention (expressed in terms of inequality of related parameters) guarantee the correct operation of the new protocol and these require analyses and are not obvious to one skilled in the art.

The R-SDMA scheme of the present invention will achieve higher data transmission data throughput, lower delay, and better radio bandwidth utilization than the prior art on a larger spectrum of roadway traffic conditions (from sparse to dense vehicle density).

BRIEF DESCRIPTION OF THE DRAWINGS

FIG. 1 is a schematic representation of a region-based SDMA scheme of the present invention.

DETAILED DESCRIPTION

The invention will now be described in four sections.

Section 1. Region-based Channel Assignment: This section describes the division of the roadway into regions and the assignment of channels to the regions, where vehicles in a region may contend to acquire access to any of the channels assigned to that region.

Section 2. Constraints of R-SDMA Parameters: This section describes the constraints on related parameters when designing an R-SDMA scheme. These are constraints that need to be taken into consideration when setting the parameter values for R-SDMA.

Section 3. Contention Resolution Protocol: This section describes a prior art RR-ALOHO protocol, a peer-to-peer, distributed contention-resolution protocol that is employed by the vehicles traveling within the same region to arbitrate channel access and release requests. This prior art protocol is an integral part of the R-SDMA scheme. It will be apparent to those skilled in the art that any dynamic TDMA conflict resolution scheme may be used.

Section 4. Additions: This section describes the present invention, in terms of add-ons to Sections 1-3. The add-ons are needed to address issues such as handover between regions, relaxation of some assumptions on parameters, and multichannel aggregation.

Collectively the four sections form an integral method of channel allocation for VANET.

Section 1. Region-Based Channel Assignment

We assume that all vehicles in the VANET are able to determine their current location. This can be achieved in any conventional manner, such as through an on-board GPS device, possibly with the assistance of an IMU (Inertial Measurement Unit) that can estimate the current location when the GPS signal is obscured. The pool of channels that is accessible to a vehicle is determined by the region where the vehicle is currently traveling.

Without loss of generality and in order to simplify the description, we consider a one-lane roadway as shown in FIG. 1. The R-SDMA scheme of the present invention can be easily extended to multiple lane roadways. The roadway segment is divided into a number of fixed-length regions 102: $R_1, R_2, \ldots R_m$. Each region is an l-by-w rectangle, where w is the width of the lane and l is a multiple of w, i.e., l=k×w, for some integer k.

The integer k is a configurable parameter. Further assume, without loss of generality, that each vehicle occupies a w-by-w square area. This implies that at most k vehicles can reside in a region.

The radius of the radio transmission range 104 of each vehicle is assumed to be r.

Assume, without loss of generality, that there are a total of p radio channels, 0, 1, 2, . . . p, which can be grouped into n disjoint radio channel pools 106, $C_0, C_1, \ldots, C_{n-1}$, where each radio channel pool consists of k radio channels 108:

$$C_0 = \{0, 1, \ldots k-1\}$$

$$C_1 = \{k, k+1, \ldots, 2k-1\}$$

$$C_{n-1} = \{(n-1)k, (n-1)k+1, \ldots p-1\}.$$

For each region $R_i$, it is assigned the channel pool $C_{i \bmod n}$ 110. This assignment may be expressed as a mapping function $f$ 112:

$$f(R_i) = C_{i \bmod n}$$

The scheme will require vehicles traveling within the region $R_i$ to acquire a channel (time slot) from the channel pool $C_{i \bmod n}$ before it can start to transmit data on that channel. Section 3 below will describe a protocol of how a vehicle can acquire a channel from the channel pool while some other vehicles traveling within the same region may also be requesting channels from the pool.

The following algorithm outlines, based on the above description, how a vehicle determines the channel pool it can access at the current time. Assume each vehicle has an on-board computer including a memory storage unit or the like pre-loaded with the above region partition information and mapping function. This can be done for example when the OBU (on-board unit) is installed in the vehicle. Alternatively, the information can also be modified later at car service time or provisioned over-the-air through wireless communication.

Algorithm determineChannelPool( )

1. Obtain the vehicle's current location L from the on-board GPS device.

2. Determine which region the vehicle is currently located within based on L. Let that region be region $R_i$.

3. By computing the value j=(i mod n), the vehicle concludes that $C_j$ is the radio channel pool the vehicle can access at present time.

Section 2. Constraints of R-SDMA Parameters

The following description describes two constraints that are imposed on the parameters in order to ensure correctness of the proposed R-SDMA scheme.

The first constraint concerns the correct operation of the contention resolution protocol used by the vehicles in the same region to acquire the channel: A vehicle can acquire a channel from the channel pool allocated to its current region (namely the region in which the vehicle is currently traveling) only if the channel is not used by any other vehicle in the region.

To meet this requirement, all vehicles in the same region must be able to receive the signals sent from each other vehicle so each vehicle can independently determine the state of each channel in the channel pool. To ensure this property, the transmission range of each vehicle must be larger than the region length.

Assuming all vehicles have the same radio transmission range radius r, then $r \geq l = kw$ Or, more precisely, $$k \leq \left\lfloor \frac{r}{w} \right\rfloor \qquad \text{(Constraint 1)}$$

The next constraint is concerned with channel reuse.

To exploit channel reuse, the channel pool assigned to a certain region can be re-assigned to another region with a distance that is far enough away to avoid radio interference. The distance between these two regions (allocated the same radio channel pool) should be far enough such that the transmission from one region will not interfere with that from the other region. This distance is known as the "channel reuse distance."

The constraint derived below enforces the above "channel reuse distance" requirement. Consider a vehicle v with transmission range r that resides in the region $R_j$. The following regions $R_{i-\lceil \frac{r}{kw} \rceil}, \ldots, R_{i-1}, R_i, R_{i+1}, \ldots, R_{i+\lceil \frac{r}{kw} \rceil}$ are then all within the transmission range of v (as shown by the circle 114). No region within the above range should be allocated the same channel pool as the one allocated to $R_i$. Otherwise, collisions may occur when vehicles from different regions assigned the same channel pool try to transmit at the same time. The above property implies that no two regions in the above range should receive the same channel pool (i.e. all regions must have different channel pools), which leads to:

$$n \geq 2 \lceil \frac{r}{kw} \rceil + 1 \qquad \text{(Constraint 2)}$$

Section 3. Contention Resolution Protocol

In R-SDMA, there is no central controller for channel access control. A peer-to-peer based distributed contention resolution scheme must be employed by all vehicles within a region $R_i$ to arbitrate the requests to acquire and access the radio channels from the channel pool $C_{i \bmod n}$. For this purpose, any prior art distributed contention resolution protocol for distributed networks can be considered as a candidate (albeit with necessary modifications), for example: Carrier Sense Multiple Access/Collision Avoidance (CSMA/CA) and RR-ALOHA-based protocol. In the following description the RR-ALOHA protocol is used as the contention resolution mechanism for R-SDMA scheme.

Description of RR-ALOHA:

Channel State

First, we define the state of a channel as either "used" or "unused", according to the following rules:

Rule-1. A channel is in the unused state if either (a) the channel is idle (i.e., no vehicle is transmitting on the channel), or (b) a collision occurs on the channel (i.e., two or more vehicles transmit on the same channel simultaneously).

Rule-2. A channel is in the used state if exactly one vehicle is transmitting on the channel.

By the definition above, a channel will be either in the used state or in the unused state, and nothing else.

Each vehicle in the network can correctly determine the current state of a channel by listening to the time slots of the channel. Recall that a channel consists of the time slots at the same position in a sequence of frames. The vehicle needs to listen to each of these slots to update the current state of the channel. If the time slot is silent (no signal detected) or contains corrupted data, then according to Rules 1(a) and 1(b), respectively, it is in the unused state. If the time slot contains valid data then, according to Rule-2, it is in the used state. It will be apparent that following Constraints 1 and 2, that the state of any channel as observed by the vehicles in the network is consistent among all the vehicles. That is, all vehicles will observe and conclude the same and correct state of a channel autonomously.

To Receive SCA Messages and Update Channel States

Each vehicle maintains an array u[0 . . . n*k−1] in an onboard memory device, where u[i] stores the state of radio channel i. Note that, subject to the value of r (transmission radius) and Constraint 2, the vehicle may not be able to hear the signals transmitted on some of the channels by vehicles far away. For those channels, the value NULL is assigned to their corresponding entry in the array, indicating that the state of the channel is unknown to the vehicle. Note that its state may be known by some other vehicles that reside in a region that can hear the signal transmitted on that channel.

Each vehicle will execute the following function to (i) receive SCA messages broadcasted from other vehicles, and (ii) to update the channel state array u[0 . . . n*k−1].

receive( ): We assume the vehicle has turned on the radio receiver. If not, turn it on.

Listen to each subsequent channel i and perform the following:
1. if channel i contains a valid SCA message, then forward the message to the upper layer application for processing, and update u[i] as used,
2. if channel i is idle (no other vehicle is sending data on this channel), then update u[i] as unused,
3. if channel i contains corrupted data (two or more vehicles is sending data simultaneously on this channel), then update u[i] as unused.

The vehicle will turn on the function receive( ) when it is interested in receiving or broadcasting SCA messages from or to the network. The function will run indefinitely as it continues to listen each time a slot passes by, until the vehicle turns it off. The vehicle turns off the receive( ) function when it is no longer interested in receiving or broadcasting any SCA message.

To Send SCA Messages

The following functions are involved when a vehicle v wants to send SCA messages to the network.

determineChannelPool( ): The vehicle must constantly retrieve its current location information from its on-board GPS device. Once it detects that it has entered a covered region for the first time or moves into an adjacent region, say region $R_i$, it will call discoverChannelPool( ) to determine the channel pool that is allocated to this region, namely $C_{i\ mod\ n}$. The algorithm is as described above in Section 1.

The frequency of retrieving location data from GPS device must be high enough to ensure the available channel pool is correctly updated. This frequency will depend on the length of the region and the vehicle speed.

With this function, the vehicle's radio transmitter is always aware of the radio channel pool assigned to the region where the vehicle is currently traveling.

contend( ): Suppose $C_j$ is the channel pool allocated to the region where the vehicle v is currently traveling. To broadcast a SCA message msg, v must acquire an unused channel from $C_j$ on which v can transmit the data. This is performed by v as follows:
1. Select a channel c from $C_j$ whose state is unused by examining u[i] for each channel i∈$C_j$. Note that in the case that v just turns on the receiver, the state of the channels in $C_j$ may not have been correctly recorded in the array u[ ]. In such case, v needs to defer the selection of an unused channel until at least one unused channel is discovered in the receive( ) function. The upper bound of the delay is the frame length, that is, k time slots.
2. Send the message msg out on channel c by calling the function send(msg, c), where c is the unused channel selected in Step 1. Function send( ) is described in the subsequent section.
3. During step 2, vehicle v's receive( ) function, as described earlier, will listen to the channel c and update the state of c as a result of the transmission taken place in Step 2. Two cases arise as the result:
1.1 The state u[c] is used: In accordance with step 1 of the receive( ) function, it implies that v has successfully transmitted the message on channel c (without colliding with messages sent out simultaneously by other vehicles) in Step 2 above. Vehicle v can continue to use channel c's time slots in subsequent frames to send the remaining SCA information.
1.2 The state u[c] is unused: In accordance with step 3 of the receive( ) function, it implies that a collision occurs on channel c (at least another vehicle is also trying to transmit on the same channel) during Step 2 above. In this case v will re-execute contend( ). A back-off window and/or random selection of unused channels must be implemented here to avoid competing vehicles selecting the same unused channel in an indefinite period.

send(msg, c): The vehicle sends out the a SCA message msg by transmitting it on the next time slot of channel c.

Once a vehicle v successfully sends a message on a channel, say on time slot $S_{i,k}$, it can continue to execute the send( ) function to send messages in the subsequent time slots, $S_{i+1,k} S_{i+2,k}$ . . . , of the channel. Other vehicles will overhear the first transmission by v on slot $S_{i,k}$ and update the state u[c] as used, marking c as being acquired and used by v. Consequently, those vehicles will not contend on channel c and thus no collision will occur.

Channel Release

There are two approaches for a vehicle v to release a channel c after it completes the transmission on c (assuming the last message was sent out in time slot $S_{e,k}$):

A. Vehicle v appends a special symbol to the end of the message sent in time slot $S_{e,k}$ indicating the end of the transmission by v. Other vehicles who overhear this time slot will detect this symbol and update their u[c] entry as unused. The vehicles then are free to contend for channel c in its next time slot $S_{e+1,k}$ or a later time slot.

B. Vehicle v completes transmission of last message in time slot $S_{e,k}$ of channel c and appends no special symbol. That is, v sends out the last message just as any other regular message without any indication that this is the last message. In this ease, the state of channel c, u[c], will remain as "used" on all vehicles (since they have no means to know v has completed its transmission). Consequently, no vehicle will contend for channel c in its next time slot $S_{e+1,k}$ since u[c] is marked as "used". This results in time slot $S_{e+1,k}$ being idle (no vehicle is transmitting during the time slot) and thus all vehicles will update u[c] as "unused" (in accordance with step 2 of receive( ) function). Subsequently, all vehicles are free to contend for c in the next time slot $S_{e+2,k}$ or a later time slot.

In comparison, option A requires insertion and handling of a special symbol which incurs overhead not required by option B. On the other hand, option A has the advantage that the release of the channel is one timeframe earlier than that of option B.

Section 4. Additions

Handoff Between Regions

A vehicle v may move from one region $R_i$ to the next region $R_{i+1}$ during the transmission of SCA messages. When this occurs, the vehicle needs to acquire a new channel from the channel pool allocated to region $R_{1+1}$. This is performed as described below.

When v leaves $R_i$ and enters into $R_{1+1}$ (which can be discovered by the on-board GPS device), v will release the channel it used in $R_i$ according to the procedure described in the previous section. It then executes discoverChannelPool( ) to identify the channel pool $C_j$ allocated to $R_{i+1}$ and performs the contend( ) function to reserve an unused channel c from $C_j$ and continues the SCA transmission on c.

It is also possible for v to reserve an unused channel from $C_j$ before it enters into $R_{i+1}$ so as to avoid the delay caused by potential collisions in $R_{i+1}$. This will require setting r>1 (transmission range greater than region length) so v can hear transmissions from all vehicles in $R_{i+1}$ and thus correctly determine the state of the channels in $C_j$.

Multi-Channel Aggregation and Minimizing the Longest Inter-Channel Delay

A vehicle may also acquire more than one channel in a region if it needs more bandwidth for data transfer. The protocol will be the same as described: the second channel can be acquired after the first channel is acquired by a vehicle. This also results in better bandwidth utilization under sparse vehicle density.

When a road emergency is detected by a vehicle, the vehicle may want to broadcast the emergency message to surrounding vehicles immediately and repeatedly over the channels that it acquires. Repetitive broadcasting is necessary in order to disseminate the message to as many vehicles as possible. In such a situation, it is imperative to make sure that the message can be sent out repeatedly without long delay due to long inter-channel (time slot) interval. Unfortunately, the channel assignment scheme described in Section 1 where the channel pool $C_i$ consists of $$C_i=\{ik, ik+1, \ldots, ik+(k-1)\}$$

will not meet this requirement. For example, consider p=15, n=5 and k=3, we will have
$C_0=\{0,1,2\}$, $C_1=\{3,4,5\}$, $C_2=\{6,7,8\}$, $C_3=\{9,10,11\}$, $C_4=\{12,13,14\}$. Now suppose a vehicle is currently traveling in Region 2 and has acquired two channels (namely two time slots), channels 3 and 4, from $C_1$. Now if an emergency is detected at the beginning of time slot 5, the vehicle will have to wait for the next coming of time slot 3 to send out the message. And the waiting time will be 15−5+3=13 time slots. In general, the worst case delay is p−h, where h is the number of channels acquired by the vehicle. But given that the vehicle has acquired two channels, we would have expected the waiting time to be ceiling (15/2)=8 time slots if the two channels are equally-spaced in the cycle of 15 time slots.

We introduce an alternative channel assignment that will mitigate the above long inter-channel delay. Given p=n*k channels, we assign the channels, starting at channel 0 in an increasing order, in a round-robin manner to channel pools $C_0, C_1, \ldots, C_{n-1}$. That is, $C_i$ consists of $$C_i=\{i, n+i, 2n+i, \ldots, (k-1)n+i\}.$$

Following the example above, with this new assignment we will obtain $$C_0=\{0,5,10\}, C_1=\{1,6,11\}, C_2=\{2,7,12\}, C_3=\{3,8,13\},$$
$$C_4=\{4,9,14\}.$$

In this case, suppose the vehicle traveling in Region 2 acquires two channels, say channel 1 and 6. Now consider the worst case when an emergency is detected at time slot 7. The emergency message can be sent out at the next coming time slot 1. The delay therefore is 15−7+1=9 time slots, which is an improvement of the original channel assignment scheme. In general, the worst case delay is p−1−(h−1)*n, where h is the number of channels acquired by the vehicle.

Extensions:

A. In the scheme described above, each region contains at most k vehicles and there are k channels allocated to each region. In practice, we may allow more vehicles than the number of channels in a region by setting l=h×w where h>k. This will result in better bandwidth utilization when vehicle density is sparse. For example, by setting h=20 and k=10, each region is the length of 20 vehicles and is allocated 10 channels. If the average normal traffic is 8 vehicles per region then the above configuration will result in better bandwidth utilization (8 out 10 channels are utilized) than if we set k=20 (8 out of 20 channels are utilized).

B. The concept of the present invention can be extended to multiple roadway lanes (of same direction) in two different ways:

1. Each lane adopts an independent R-SDMA scheme as described above. A vehicle traveling in a lane will compete for channels using the R-SDMA scheme that governs the lane it is traveling on. The disadvantage is handoff may happen frequently if the vehicle switches lanes frequently.

2. Treat the multiple lanes (of the same direction) as a single "virtual lane" and adopts the R-SDMA scheme for this virtual lane. In this case, a "region" will be a rectangle containing multiple lanes. We may set the value of k and h (per the discussion in paragraph A above) to better accommodate the traffic in the multi-lane region.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions stored in a computer or machine usable or readable storage medium or device, which causes the computer or machine to perform the steps of the method when executed on the computer, processor, and/or machine. A computer readable storage medium or device may include any tangible device that can store a computer code or instruction that can be read and executed by a computer or a machine. Examples of computer readable storage medium or device may include, but are not limited to, hard disk, diskette, memory devices such as random access memory (RAM), read-only memory (ROM), optical storage device, and other recording or storage media.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

While there has been described and illustrated a channel allocation and access scheme for Vehicular Ad Hoc Networks (VANET) that efficiently assign radio channels to mobile nodes (vehicles) to ensure timely delivery of broadcast data messages in the VANET network, it will be apparent to those skilled in the art that variations and modifications are possible without deviating from the broad principles and teachings of the present invention which shall be limited solely by the scope of the claims appended hereto.

What is claimed is:

1. A method of channel allocation and access by vehicles in a Vehicular Ad Hoc Network (VANET) comprising the steps of:
    dividing a service area into a plurality of regions;
    associating with each region p non-overlapping radio channels grouped into n disjoint radio channel pools where each pool comprises k radio channels;
    each vehicle determining its location in a region;
    dynamically resolving channel conflicts between vehicles; and
    allocating a channel to each vehicle in a region;
    where each vehicle has a radio transmission range r, where $r \geq l = kw$, where l is the length of a region, w is the width of a region and k is a constant; and
    where the transmission range of a vehicle is selected so that $$n \geq 2 \left\lceil \frac{r}{kw} \right\rceil + 1,$$

where n is the quantity of disjoint radio channel pools, r is the radio transmission range, k is the quantity of vehicles, and w is width of a region.

2. The method as set forth in claim 1 further comprising limiting the quantity of vehicles in each region and associating non-overlapping radio channel pools to each region.

3. The method as set forth in claim 1 where each region comprises a length l and a width w, where l is a multiple k of w, where k is the maximum quantity of vehicles in a region.

4. The method of claim 1 where $$k \leq \left\lfloor \frac{r}{w} \right\rfloor$$

and r is the radio transmission range and w is the width of the region.

5. The method of claim 1 where said dynamically resolving channel conflicts comprises RR-ALOHA (Reliable Reservation ALOHA) scheme.

6. The method of claim 1 further comprising computing the value $j = (i \bmod n)$ and the vehicle determines which channel pool $C_j$ the vehicle can access.

7. The method of claim 1 further comprising each vehicle determining the channel state of a channel and if the channel is unused the vehicle transmits data on that channel.

8. The method as set forth in claim 1, further comprising handing off a vehicle as the vehicle travels between regions comprising identifying a channel pool allocated to the entering region and reserving an unused channel from the channel pool to continue transmission on the unused channel.

9. The method of claim 1 where the channels in a channel pool are assigned in a round-robin manner and the vehicle is assigned more than one channel.

10. The method of claim 1 where more vehicles are in region than there are channels.

11. The method of claim 1 where the service area is a single lane roadway.

12. The method of claim 1 where the service area is a multiple lane roadway and each vehicle in a lane compete for a channel.

13. The method of claim 1 where the service area is a multiple lane roadway and each region is expanded to include multiple lanes.

* * * * *

UNITED STATES PATENT AND TRADEMARK OFFICE
CERTIFICATE OF CORRECTION

PATENT NO. : 8,488,545 B2  Page 1 of 1
APPLICATION NO. : 13/110118
DATED : July 16, 2013
INVENTOR(S) : Chen et al.

It is certified that error appears in the above-identified patent and that said Letters Patent is hereby corrected as shown below:

Title Page, Item (73), under "Assignee", in Column 1, Line 1, delete "Telcodia" and insert -- Telcordia --, therefor.

In the Specification

In Column 1, Line 20, delete "TILE" and insert -- THE --, therefor.

In Column 4, Line 43, delete "locations" and insert -- locations. --, therefor.

In Column 5, Line 55, delete "DRAWINGS" and insert -- DRAWING --, therefor.

In Column 10, Line 29, delete "ease," and insert -- case, --, therefor.

In Column 10, Line 48, delete "$R_{1+1}$." and insert -- $R_{i+1}$. --, therefor.

In Column 10, Line 50, delete "$R_{1+1}$" and insert -- $R_{i+1}$ --, therefor.

In the Claims

In Column 14, Line 5, in Claim 3, delete "where 1" and insert -- where l --, therefor.

In Column 14, Line 26, in Claim 8, delete "handing off" and insert -- handling off --, therefor.

Signed and Sealed this
Twenty-first Day of April, 2015

Michelle K. Lee
*Director of the United States Patent and Trademark Office*